United States Patent [19]
Okamoto et al.

[11] Patent Number: 4,525,027
[45] Date of Patent: Jun. 25, 1985

[54] SINGLE MODE OPTICAL FIBERS

[75] Inventors: Katsunari Okamoto; Takao Edahiro, both of Mito; Akio Kawana, Komae; Tetsuo Miya, Mito, all of Japan

[73] Assignee: Nippon Telegraph & Telephone Public Corp., Japan

[21] Appl. No.: 648,334

[22] Filed: Sep. 5, 1984

Related U.S. Application Data

[63] Continuation-in-part of Ser. No. 518,772, Aug. 2, 1983, abandoned, which is a continuation of Ser. No. 192,259, Sep. 30, 1980, abandoned.

[30] Foreign Application Priority Data

Oct. 8, 1979 [JP] Japan ................. 54-130449

[51] Int. Cl.³ ............................... G02B 5/172
[52] U.S. Cl. ................... 350/96.30; 350/96.34
[58] Field of Search ............. 350/96.29, 96.30, 96.34

[56] References Cited

U.S. PATENT DOCUMENTS

| | | | |
|---|---|---|---|
| 3,659,915 | 5/1972 | Maurer et al. | 350/96.30 |
| 3,711,262 | 1/1973 | Keck et al. | 350/96.30 X |
| 4,089,586 | 5/1978 | French et al. | 350/96.30 |
| 4,306,767 | 12/1981 | Kawachi et al. | 350/96.34 X |
| 4,402,570 | 9/1983 | Chang | 350/96.30 |

OTHER PUBLICATIONS

Niizeki, "Single Mode Fiber at Zero-Dispersion Wavelength", *Proc. of Topical Mtg. on Int. & Guided Wave Optics* (Salt Lake City), Jan. 1978, pp. MB1-1 to MB1-4.

Miya et al., "Ultimate Low-Loss Single-Mode Fibre at 1.55 μm", *Electron. Lett.*, vol. 15, No. 4, Feb. 1979, pp. 106-108.

White et al., "Zero Total Dispersion in Step-Index Monomode Fibres at 1.30 and 1.55 μm", *Electron. Lett.*, vol. 15, No. 13, Jun. 1979, pp. 396-397.

Okoshi et al., "Single-Polarisation Single-Mode Optical Fibre With . . . ", *Electron. Lett.*, vol 16, No. 18, Aug. 1980, pp. 712-713.

*Primary Examiner*—John Lee
*Attorney, Agent, or Firm*—Charles W. Helzer

[57] ABSTRACT

In a single mode optical fiber comprising a core made of glass and a cladding surrounding the core and made of glass, when a difference $\Delta$ between refractive indices $n_1$ and $n_2$ of the core and cladding is expressed by $(n_1-n_2)/(n_1)\times 100\%$, the refractive indices $n_1$ and $n_2$ are determined to satisfy a relation $1.0<\Delta<3.6$ and a diameter of the core is determined according to this value of $\Delta$.

4 Claims, 4 Drawing Figures

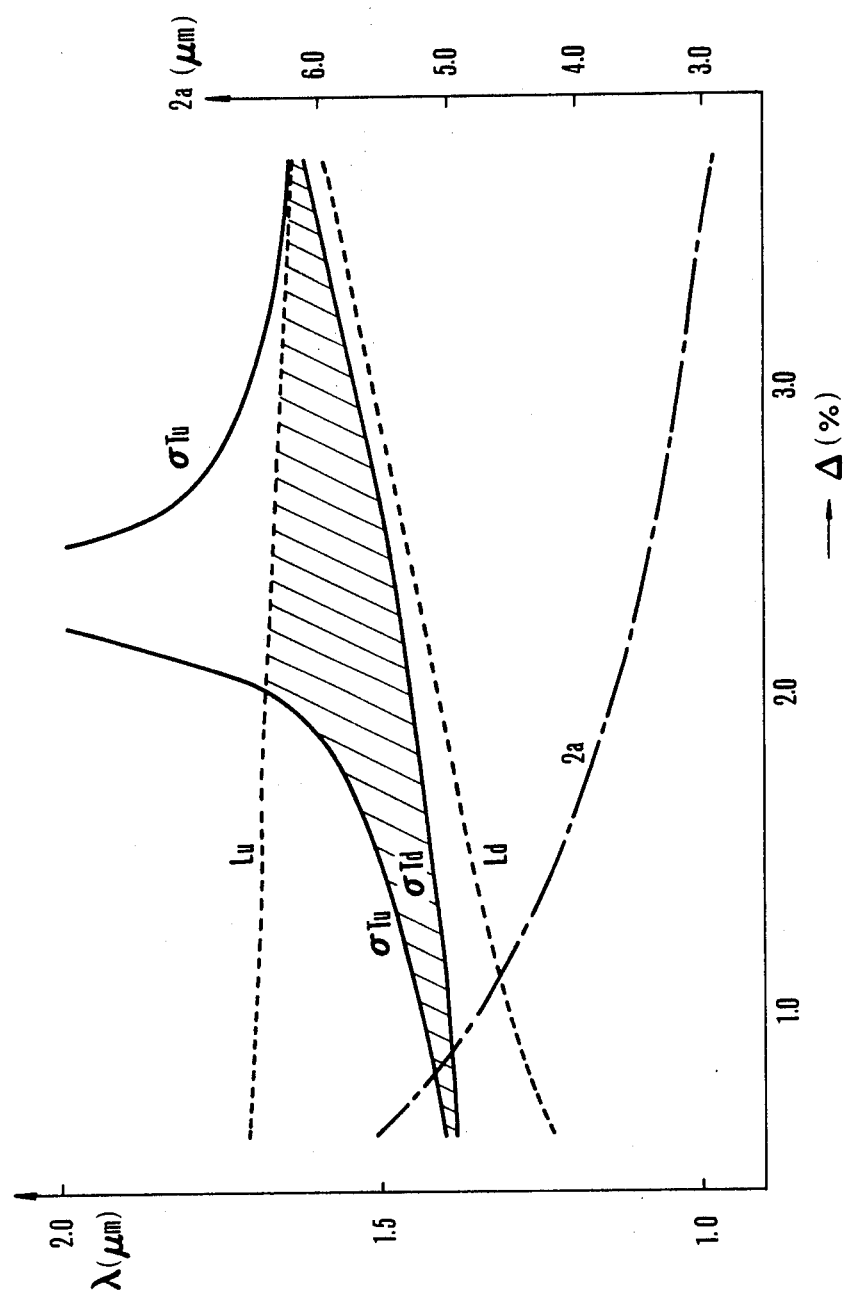

SINGLE MODE OPTICAL FIBERS

This application is a Continuation-In-Part application of U.S. patent application Ser. No. 518,772 filed Aug. 2, 1983 which in turn was a Continuation application of parent application Ser. No. 192,259 filed Sept. 30, 1980 (both now abandoned).

BACKGROUND OF THE INVENTION

This invention relates to a single mode optical fiber, and more particularly a single mode optical fiber in which a core is surrounded by a cladding.

Various efforts have been made to improve the single mode optical fiber to meet requirements raised by the development of optical communication and in recent years improved single mode optical fibers have been developed which in addition to ordinary characteristics of light weight, noninductive and no cross-talking have a lower loss than a transmission line utilizing metal conductors such as a millimeter wave guide and can transmit data over a wider frequency band. A long distance ultra wide frequency band optical communication system operating at a frequency of 1 GHz and without using any repeating station, is now being planned by using optical fibers.

It has been theoretically determined that it is necessary to reduce the total dispersion to be less than $\pm 1$ ps/km/nm and to reduce the transmission loss to be less than 0.5 dB/km in order to realize such long distance ultra wide band transmission. Considering the transmission characteristics of present day optical fibers from this standpoint of view, the ultra wide band long distance transmission involves certain problems for the following reason.

In an optical fiber, light entering into the core transmits therethrough by repeatedly being reflected at the interface between the core and the cladding, and deterioration of the transmission characteristics caused by the dispersion of light can be analyzed as follows: (1) multimode dispersion.

This is caused by the fact that the propagation constant representing the propagation state of the light varies nonlinearly with respect to the angular frequency of the light and that as the angular frequency increases, higher order modes appear in the light propagating mode so that group velocities vary for different modes. (2) material dispersion ($\delta_M$).

This is caused by the fact that the refractive index of glass constituting the optical fiber varies nonlinearly and that the material dispersion $\delta_M$ of a single mode optical fiber is shown by the following equation $$\delta_M = \frac{\lambda}{C} \cdot \frac{d^2 n_1}{d\lambda^2} \tag{1}$$

where $n_1$ represents the refractive index of the core, $\lambda$ the wavelength of light and C the light velocity in vacuum. (3) waveguide dispersion $\delta_W$.

The waveguide dispersion is determined by the relationship between the propagation constant $\beta$ and the angular frequency of light $\omega$ and is expressed by the following equation in the case of the single mode optical fiber $$\delta_W = \frac{1}{\lambda} \cdot \omega \cdot \frac{d^2 \beta}{d\omega^2} \tag{2}$$

In the case of a multimode optical fiber it is necessary to take into consideration the three dispersions described above, but the invention is directed to a single mode optical fiber for the purpose of decreasing signal distortion by minimizing as far as possible the dispersions. Hence, it is not necessary to consider the multimode dispersion but only the material dispersion and the waveguide dispersion must be considered. Accordingly, in the case of the single mode optical fiber a sum ($\delta_M + \delta_W$) of the material dispersion $\delta_M$ and the waveguide dispersion $\delta_W$ constitutes the total dispersion $\delta_T$ and the frequency bandwidth f in which signals can be transmitted without distortion is expressed by the following equation.

$$f = (0.187)/(\delta_T) \tag{3}$$

In a typical prior art optical fiber the diameter of the core $2a = 9.0$ microns, the refractive index of the core $n_1 = 1.46319$, and the difference in the refractive indices of the core and cladding $$\Delta = \left( \frac{n_1 - n_2}{n_1} \times 100\% \right) = 0.2\%.$$

Examples of such single mode fiber are described in a K. Daikoku et al. paper entitled "Direct Measurement of Wavelength Dispersion in Optical Fibres—Difference Method", Electronics Letters, 1978, Vol. 14, No. 5, pages 149-151.

With such prior art optical fibers, when the wavelength of light varies in a range of 0.9-1.6 microns, for example, the material dispersion varies in a range of from $+66$ ps/km/nm to $-25$ ps/km/nm and the difference in the refractive index and the core diameter has values described in the preceeding paragraph, the waveguide dispersion $\delta_W$ varies in a range of from 4 ps/km/nm to 13 ps/km/nm. For this reason, the total dispersion $\delta_T$ varies in the positive and negative directions about $\lambda = 1.43$ microns. Accordingly, when the optical fiber is operated at a wavelength $\lambda = 1.43$ microns at which the total dispersion $\delta_T$ becomes zero the distortion of the signal becomes minimum so that transmission over a long distance at a wide bandwidth becomes possible. However, if the wavelength differs from 1.43 microns even slightly, the total dispersion $\delta_T$ would increase greatly with the result that the frequency bandwidth f shown in equation (3) rapidly decreases.

Accordingly, with the prior art optical fiber, even when the total dispersion $\delta_T$ is made to be equal to $\pm 1$ ps/km/nm suitable for long distance transmission, the usable wavelength width is at most from 1.41-1.43 microns. For this reason, for long distance wide bandwidth transmission, even when the wavelength is divided or multiplexed for the purpose of improving the transmission efficiency, it has been impossible to operate the optical fiber in the wavelength range described above.

SUMMARY OF THE INVENTION

Accordingly, it is a principle object of this invention to provide an improved single mode optical fiber having wider band transmission characteristics than the prior art optical fibers thus enabling wavelength division multiplex transmission.

According to this invention, there is provided a single mode optical fiber of the type comprising a core having a diameter of 2a and made of glass having a refractive index of $n_1$, and a cladding surrounding the core and made of the glass having a refractive index of $n_2$, characterized in that, when a refractive index difference $\Delta$ is expressed by $n_1-n_2/n_1=100$, the refractive indices $n_1$ and $n_2$ are determined to satisfy a relation $1.0<\Delta<3.6$ and that the diameter 2a of the core is determined according to this value of $\Delta$.

BRIEF DESCRIPTION OF THE DRAWINGS

In the accompanying drawings:

FIG. 4 is a graph showing the relation between the refractive index difference and the wavelength of the light, the core diameter, the total dispersion, and the transmission loss characteristics obtained by simulation.

DESCRIPTION OF THE PREFERRED EMBODIMENT

Figure 1:
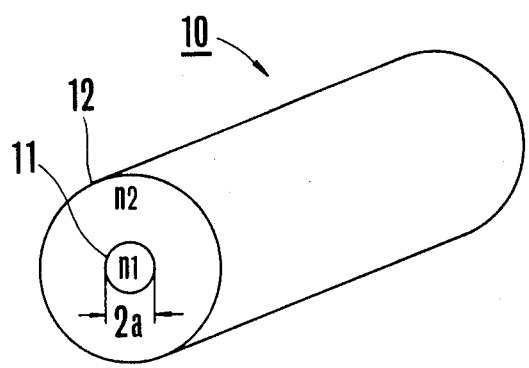
FIG. 1 is a perspective view showing the basic construction of a single mode optical fiber embodying the invention.
Figure 2:
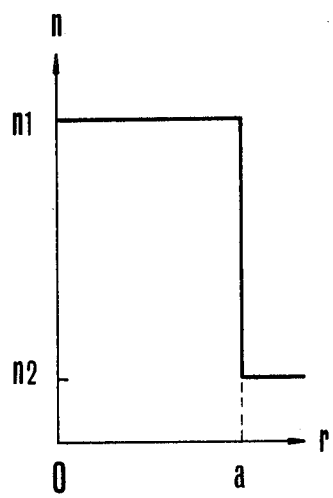
FIG. 2 is a graph showing the refractive index distribution in the radial direction of the optical fiber shown in FIG. 1.

A single mode optical fiber 10 shown in FIG. 1 comprises a core 11 made of quartz glass or the like, and a cladding 12 made of similar material and surrounding the core. Denoting the refractive index of the core 11 by $n_1$, that of the cladding by $n_2$ and the radius of the core by a, the refractive index distribution of the core as viewed in the radial direction of the optical fiber 10 is shown in FIG. 2. As can be noted from this distribution, the optical fiber of this type has a so-called step type refractive index distribution. The refractive index difference between the core 11 and the cladding 12 is expressed by the following equation.

$$\Delta = \frac{n_1 - n_2}{n_1} \times 100\ (\%) \qquad (4)$$

According to this invention, this refractive index difference $\Delta$ is selected to lie in a range of from 1% to 3.6% and the diameter 2a of the core 11 is selected to have a suitable value in a range of 4.8 to 3.0 microns as the $\Delta$ varies (i.e., the diameter 2a would decrease as $\Delta$ increases). By using such values of the refractive index difference $\Delta$ and the core diameter 2a, it is possible to obtain a novel optical fiber having a total dispersion $\delta_T$ of less than $\pm 1$ ps/km/nm and a theoretical value L of the transmission loss closely related to the refractive index difference $\Delta$ of less than 0.5 dB/km. The optical fiber embodying the invention can use a wavelength width of 0.05 to 0.23 microns depending upon the values of the refractive index difference $\Delta$ and the core diameter 2a. As a consequence, with a wavelength width of 0.05 micron, a two wavelength multiplexing becomes possible assuming a spacing of the wavelength multiplexing of 230 Å where the wavelength shift of a semiconductor laser caused by temperature variation is 200 Å and the spectral width of a light source is from 20 to 30 Å.

The lower limit of the refractive index difference $\Delta$ is determined by the fact that the bandwidth of the wavelength is 0.05 micron so that as $\Delta$ decreases the wavelength width gradually decreases thus making it difficult to accomplish wavelength multiplexing. The upper limit of the refractive index difference $\Delta$ is determined by the fact that as the core diameter becomes smaller than 3 microns, the coupling between adjacent cores as well as the coupling between the core and the light source become imperfect so that losses at these portions increase. With the present day coupling construction, when the core diameter is 3 microns, it is possible to limit the coupling losses to be less than 10 dB. Moreover, with this construction, it is possible to improve by 3 to 4 times the photo-coupling efficiency with the light source since the permissible light receiving angle increases due to the increase in the refractive index difference between the core and the cladding.

Furthermore, when the optical fiber is used in a submarine cable the light is perfectly confined within the core due to a high refractive index difference, thus decreasing the increase in the transmission loss caused by hydrostatic pressure in contrast to the prior art optical fibers.

Figure 3:
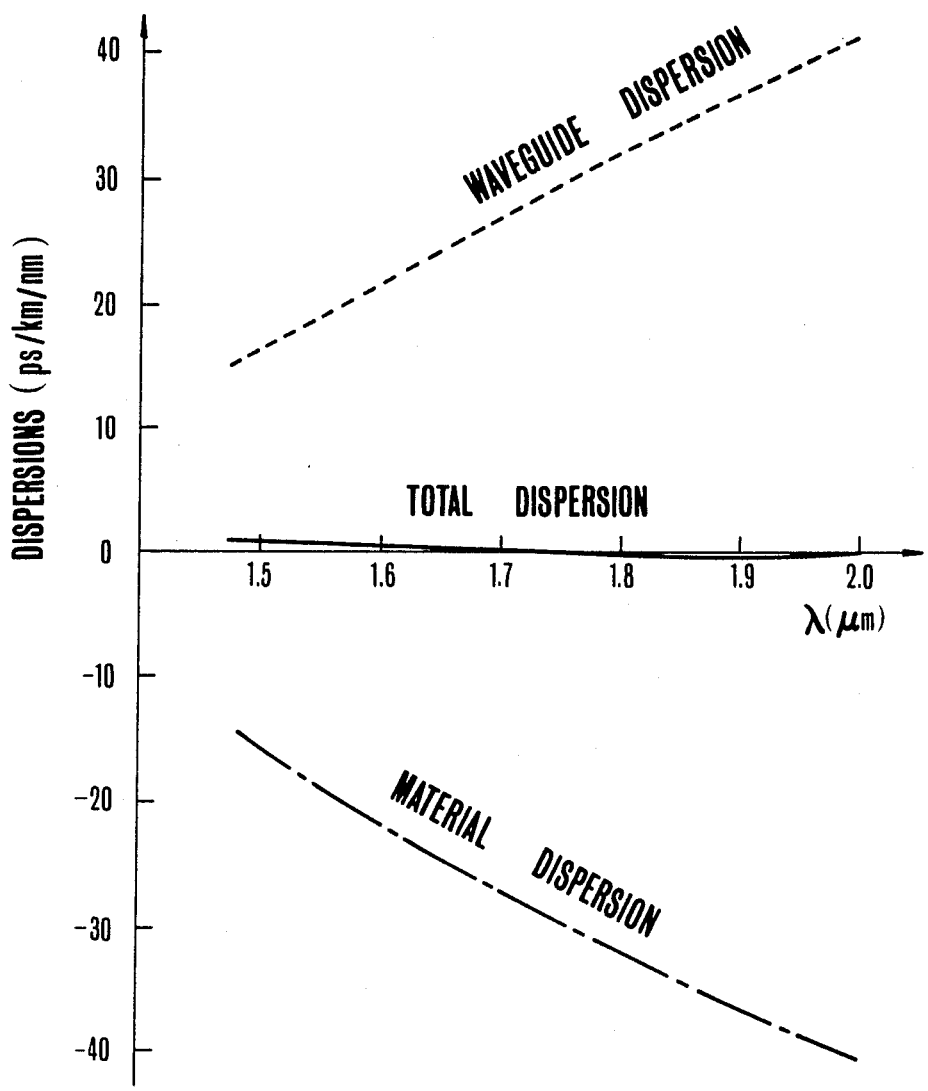
FIG. 3 is a graph showing the relationship between the wavelength and dispersion characteristics $\delta_W$, $\delta_M$ and $\delta_T$ of the optical fiber shown in FIG. 1.

FIG. 3 is a graph showing the relationship between the wavelength of the light to be transmitted through the single mode optical fiber of this invention and the material dispersion $\delta_M$, the waveguide dispersion $\delta_W$ and the total dispersion, i.e., the sum of $\delta_M$ and $\delta_W$. In this case, the core 11 and the cladding 12 were essentially made of quartz galass. In making the core a germanium dopant was used for making the refractive index thereof larger than that of the cladding. Thus, the refractive index difference was $\Delta=2.4\%$, and the diameter of the core 11 was 2a=3.46 microns. As can be noted from the characteristics shown in FIG. 3, the total dispersion $\delta_T$ was made to be less than $\pm 1$ ps/km/nm for a wavelength range of $\lambda=1.48-2.0$ microns.

By using an electronic computer, we have made a simulation calculation for the purpose of confirming the operation and the advantageous effect of the single mode optical fiber according to this invention. The following table shows the values of the diameter 2a of the core 11 and a wavelength range $\lambda_b$ in which the total dispersion $\delta_T$ lies in a range of $\pm 1$ ps/km/nm when the refractive index difference $\Delta$ varies between 0.8 and 3.6%.

TABLE

| $\Delta$ (%) | 2a ($\mu$m) | $\lambda_b$ ($\mu$m) |
|---|---|---|
| 3.8 | 2.94 | 1.63 –1.65 |
| 3.6 | 3.00 | 1.55–1.61 |
| 2.4 | 3.46 | 1.40–2.00 |
| 2.0 | 3.68 | 1.46–1.62 |
| 1.5 | 4.12 | 1.42–1.50 |
| 1.0 | 4.78 | 1.40–1.44 |
| 0.8 | 5.19 | 1.37–1.42 |
| 0.6 | 5.62 | 1.38–1.40 |

FIG. 4 is a graph showing the low dispersion region (a region bounded by $\delta_{Tu}$ and $\delta_{Td}$ curves) in which $\delta_T$ is less than $\pm 1$ ps/km/nm for the refractive index difference $\Delta$, the diameter 2a of the core 11 and a low loss region of less than 0.5 dB/km (a region bounded by curves $L_u$ and $L_d$).

These characteristic curves show that the value of 2a should be determined in a hatched area shown in FIG. 4 in order to obtain a single mode optical fiber having characteristics presently desired, i.e., a total dispersion of less than ±1 ps/km/nm, and a transmission loss of less than 0.5 dB/km. As above described, the values of Δ and 2a that determine this area are Δ=1-3.6% and 2a=4.78-3.00 microns. For example, to mainly transmit light essentially having a wavelength of about λ=1.5 microns, the refractive index difference Δ=2.4-1.5% and the diameter of the core 11 2a=3.46-4.12 microns are adequate. In a quartz glass optical fiber, it is known that the transmission loss is minimum near a wavelength of about 1.5 microns, the advantageous effect of this invention can be efficiently manifested near this wavelength. The fact that the transmission loss becomes minimum near the wavelength of 1.5 microns is described in Miya's paper entitled "Ultimate Low Loss Single Mode Fiber at 1.55 μm", Electronics Letters, Vol. 15, No. 4, pages 106-108, Feb. 15, 1979.

Furthermore, as shown in FIG. 4, where Δ=1.1% and 2a=4.62 microns, the usable wavelength bandwidth is 1.40-1.45 microns, meaning possibility of two wavelength multiplexing. Especially, where Δ=2.05% and 2a=3.67 microns, the usable wavelength bandwidth is 1.46-1.69 microns meaning a possibility of 10 wavelength multiplexing.

Although in the foregoing embodiment the core and cladding were made of quartz glass having a predetermined refractive index, incorporation of germanium acting as a dopant into the quartz glass increases the refractive index $n_1$. Thus, from equation (4) it can be noted that it is possible to increase the refractive index difference Δ. In addition to germanium, the dopant or additive may be selected from the group consisting of phosphor, titanium, aluminum, tantalum, zirconium, lead, barium, and gallium.

A specific way of determining semidiameter a of the core is as follows:

To determine the total dispersion $\delta_T$, the following formula has been found applicable.

$$\delta_T = \underbrace{\frac{1}{c} \cdot \lambda \frac{d^2 n_1}{d\lambda^2}}_{\delta_M} + \underbrace{\frac{n_1 \Delta}{c\lambda} v \frac{d^2(vb)}{dv^2}}_{\delta_W} \quad (5)$$

where:

$$b = 1 - \frac{u^2}{v^2} \quad (6)$$

$$v = \frac{2\pi}{\lambda} n_1 a \sqrt{2\Delta} \quad (7)$$

$$u = (k^2 n_1^2 - \beta^2)^{\frac{1}{2}} a \quad (8)$$

$$w = (\beta^2 - k^2 n_2^2)^{\frac{1}{2}} a \quad (9)$$

In equation (5) the first term represents the material dispersion ($\delta_M$) and the second term represents waveguide dispersion ($\delta_W$). As can be determined from equation (7), the diameter a of the core is included in v as an implicit function. Thus, the relationship between the core diameter a and the refractive index difference Δ for the purpose of the present invention of making the total dispersion nil (i.e. $\delta_T = 0$) over a wide wavelength region can be obtained through use of a computer, but it is not possible to explicitly indicate the solution.

The relationship between b and v can be found from the solution of the following equation $$\frac{u J_0(u)}{J_1(u)} - \frac{w k_0(w)}{k_1(w)} = 0 \quad (10)$$

as indicated by the Chart 2 below:

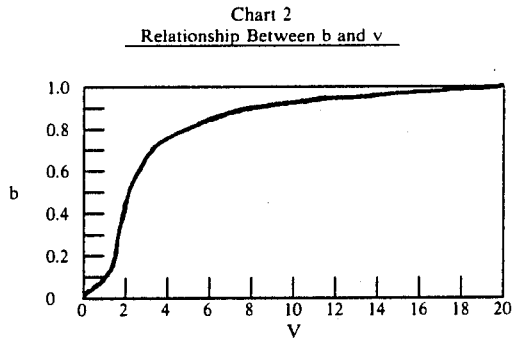

Chart 2
Relationship Between b and v

With respect to the waveguide dispersion $\delta_W$ indicated as $$\frac{n_1 \Delta}{c\lambda} v \frac{d^2(vb)}{dv^2}$$

in formula (5) above, it is reached from the formula (2) of this specification $$\delta_w = \frac{1}{\lambda} \cdot w \cdot \frac{d^2 \beta}{dw^2}$$

through the following analytical steps.

Since w=kc in which k is the wavenumber in vacuum (k=2-π/λ) and c is the light velocity, $\delta_w$ can be expressed as:

$$\delta_w = \frac{k}{\lambda c} \frac{d^2 \beta}{dk^2} \quad (11)$$

An application of $\beta = k n_1 \sqrt{1 - 2\Delta(1-b)}$ to formula (11) above results:

$$k = \frac{d\beta}{dk} = \beta + \frac{k^2 n_1^2}{\beta} \Delta k \frac{db}{dk} \quad (12)$$

Where $k^2 n_1^2 / \beta \approx k n_1$ $$k = \frac{d\beta}{dk} = \beta + \Delta n_1 k^2 \frac{db}{dk} \quad (13)$$

When formula (13) is differentiated, $$k \frac{d^2 \beta}{dk^2} = \Delta n_1 \cdot \left( 2k \frac{db}{dk} + k^2 \frac{d^2 b}{dk^2} \right) \quad (14)$$

$$= \Delta n_1 k \frac{d^2(kb)}{dk^2}$$

From formulas (11) and (14)

$$\delta_w = \frac{n_1 \Delta}{\lambda c} k \frac{d^2(kb)}{dk^2} \quad (15)$$

Since $v = kn_1 a \sqrt{2\Delta}$, formula (15) can be expressed $$\delta_w = \frac{n_1 \Delta}{\lambda c} v \frac{d^2(vb)}{dv^2} \quad (16)$$

With respect to the material dispersion of a fiber made of quartz, it is widely known that the wavelength dependency can be obtained by utilizing Sellmeier's equation. Thus, the total dispersion $\delta_T$ can be calculated based on equation (5) by applying the $\Delta$, $\lambda c$ and a of a single mode optical fiber whose initial diameter a is selected employing FIG. 4. Specifically, the wavelength dependency of $\delta_T$ is calculated to check whether or not $|\delta_T| \leq 1$ ps/km/nm stands in the low loss wavelength region of $\lambda = 1.4$ to $1.7$ $\mu$m, and in the case the condition is not satisfied, $\lambda c$ is varied to seek the c and b which satisfy the condition with the given $\Delta$.

What is claimed is:

1. A single mode optical fiber comprising a core having a diameter of $2a$ and made of glass having a refractive index of $n_1$, and a cladding surrounding the core and made of glass having a refractive index of $n_2$ wherein when a refractive index difference $\Delta$ is expressed by $n_1 - n_2/n_1 \times 100$, said refractive indices $n_1$ and $n_2$ are determined to satisfy a relation $1.0 < \Delta < 3.6$ and the diameter $2a$ of said core is selected to have a value in a range of 4.8 to 3.0 microns as determined by the value of $\Delta$.

2. The single mode optical fiber according to claim 1 wherein said core and said cladding are essentially made of quartz glass.

3. The single mode optical fiber according to claim 2 wherein said core is made of quartz glass incorporated with a dopant which makes larger the refractive index of said core than that of said cladding.

4. The single mode optical fiber according to claim 3 wherein said dopant is a member selected from a group consisting of germanium, phosphor, titanium, aluminum, tantalum, zirconium, lead, barium, and gallium.

* * * * *